United States Patent [19]

Russo et al.

[11] Patent Number: 4,743,506
[45] Date of Patent: May 10, 1988

[54] TIN OXIDE COATED ARTICLE

[75] Inventors: David A. Russo, Edison, N.J.; Georg H. Lindner, Vlissingen, Netherlands

[73] Assignee: M&T Chemicals Inc., Woodbridge, N.J.

[21] Appl. No.: 888,552

[22] Filed: Jul. 18, 1986

Related U.S. Application Data

[63] Continuation-in-part of Ser. No. 784,279, Oct. 4, 1985, abandoned, which is a continuation-in-part of Ser. No. 705,595, Feb. 26, 1985, abandoned, which is a continuation-in-part of Ser. No. 687,065, Dec. 28, 1984, abandoned.

[51] Int. Cl.4 ................................. B32B 9/00
[52] U.S. Cl. ................................. 428/389; 427/109; 427/160; 427/166; 428/379; 428/432; 428/469; 428/470; 428/472.1; 428/696; 428/702; 428/704
[58] Field of Search ............... 428/432, 702, 375, 379, 428/389, 469, 470, 472.1, 696, 704; 427/109, 160, 166

[56] References Cited

U.S. PATENT DOCUMENTS

| | | | |
|---|---|---|---|
| 2,567,331 | 9/1951 | Gaiser et al. | 117/54 |
| 2,614,944 | 10/1952 | Lylte | 117/54 |
| 2,617,741 | 11/1952 | Lylte | 117/54 |
| 3,107,177 | 10/1963 | Saunders et al. | 117/211 |
| 3,677,814 | 7/1972 | Gillery et al. | 117/211 |
| 3,759,743 | 9/1973 | Menke | 117/211 |
| 4,187,336 | 2/1980 | Gordon et al. | 428/34 |
| 4,308,316 | 11/1981 | Gordon et al. | 428/336 |
| 4,329,379 | 5/1982 | Terneu | 427/116 |
| 4,377,613 | 3/1983 | Gordon | 428/432 |
| 4,547,400 | 10/1985 | Middleton et al. | 427/160 |
| 4,548,836 | 10/1985 | Middleton et al. | 427/160 |
| 4,600,654 | 7/1986 | Lindner | 428/432 |

Primary Examiner—John E. Kittle
Assistant Examiner—P. R. Schwartz
Attorney, Agent, or Firm—S. A. Marcus; S. H. Parker; R. E. Bright

[57] ABSTRACT

A tin oxide coated article characterized by including a transparent, haze-free tin oxide coating on a substrate, such as glass. The tin oxide coating is formed by deposition from a liquid coating composition including an organotin compound, such as an alkyltin trichloride, and a haze-reducing additive, such as a fluorocarboxylic acid or acid anhydride.

9 Claims, 1 Drawing Sheet

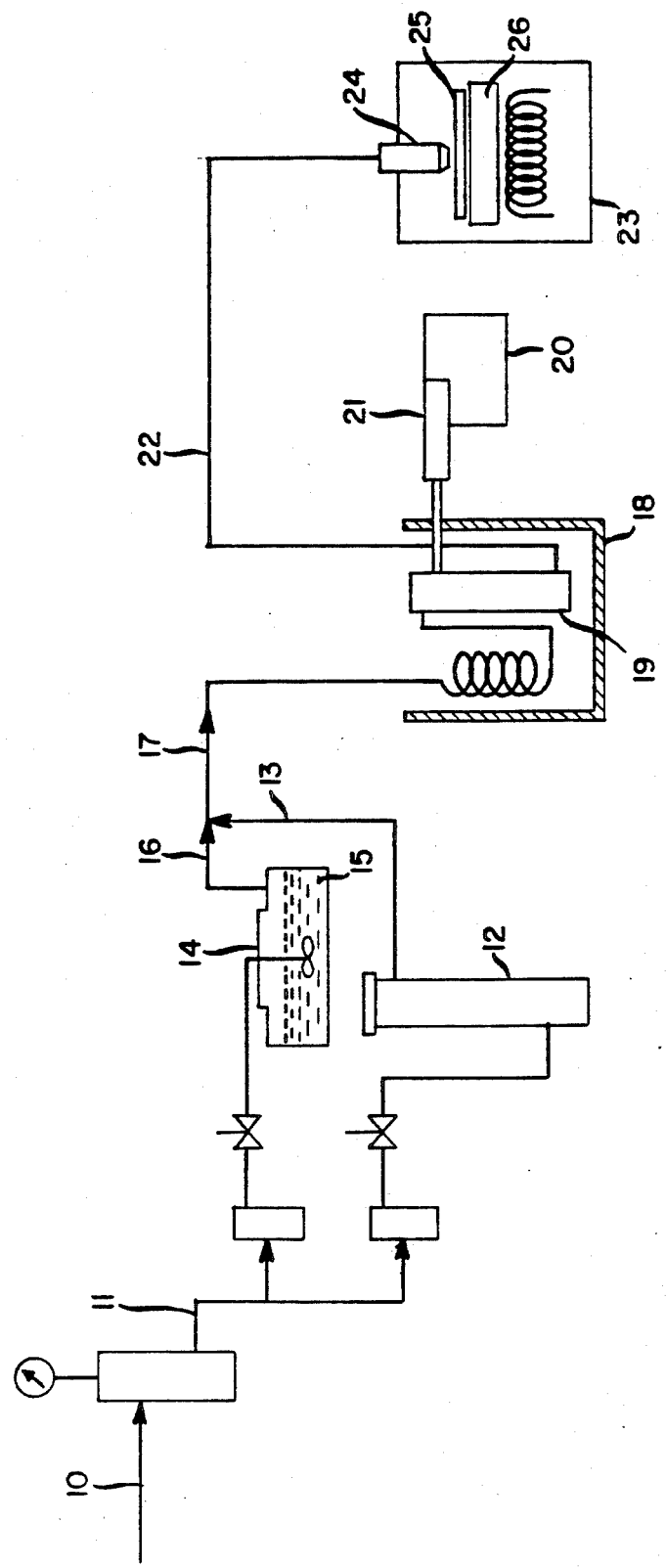

TIN OXIDE COATED ARTICLE

CROSS-REFERENCE TO RELATED APPLICATIONS

This application is a continuation-in part of copending U.S. Ser. No. 784,279, filed Oct. 4, 1985 now abandoned; which is a continuation-in-part ofcopending U.S. Ser. No. 705,595, file Feb. 26, 1985, which is a continuation-in-part of copending U.S. Ser. No. 687,065, filed Dec. 28, 1984 now abandoned.

BACKGROUND OF THE INVENTION

1. Field of the Invention

This invention relates to tin oxide coated articles, and, more particularly, to transparent, haze-free tin oxide coatings on glass made by chemical vapor deposition.

2. Description of Prior Art

Tin oxide is widely used as a coating material in optical instruments. For example, U.S. Pat. No. 4,497,700 describes the use of tin oxide as an anti-reflective coating in a multi-layer optical filter. This tin oxide coating is required to be transparent and haze-free in order to avoid interference with the optical performance of the device. Similarly, Gordon, in U.S. Pat. Nos. 4,187,336; 4,206,452; 4,308,316; and 4,377,613, uses a tin oxide coating to reduce or cancel iridescence in glass window structures. While such tin oxide coatings function effectively for the purposes intended, they introduce haze into the system unless formed under very restrictive and disadvantageous deposition conditions.

A number of patents are directed to reducing haze in tin oxide coatings, e.g. U.S. Pat. Nos. 2,567,331; 2,614,944; 2,617,741; 3,107,177; 3,677,814; 3,759,743; 4,187,336; 4,329,379; 4,547,400; and 4,548,836. These patents teach the avoidance of tin tetrachloride, or any other similar organotin compound containing a halide, e.g. chlorine, which can produce halogen acid vapors at the hot glass surface. In the event a halide-containing organotin compound is used, it is suggested that hydrazine be included in the coating composition, or that an undercoat layer of a metal oxide, for example, silicon dioxide, precede the tin oxide coating.

Accordingly, it is an object herein to provide an improved tin oxide coated article made by a chemical deposition method, which article is characterized by comprising a transparent, haze-free tin oxide coating on a substrate.

Another object of this invention is to provide haze-free tin oxide coatings on a substrate, such as glass, in which the oxide coating is produced rapidly at an elevated substrate temperature using a liquid coating composition comprising a liquid organotin compound and a haze-reducing additive.

Still another object of the invention is to provide such tin oxide coated articles characterized by including a transparent, haze-free tin oxide coating on a substrate, without requiring an undercoat layer.

A specific object of the invention is to provide a tin oxide coated article which includes a transparent, haze-free tin oxide coating on a glass substrate, which may be formed by chemical vapor deposition from a liquid coating composition.

SUMMARY OF THE INVENTION

What is provided herein is a tin oxide coated article characterized by including a transparent, haze-free tin oxide coating on a substrate, such as glass, wherein the tin oxide coating is formed by chemical deposition from a liquid coating composition comprising an organotin compound, such as an alkyltin trichloride, and a haze-reducing additive, such as a fluorocarboxylic acid or anhydride.

The haze-free tin oxide coatings produced herein can be formed from halogen containing organotin compounds, which compounds ordinarily produce hazy coatings. The haze-free tin oxide coatings herein are deposited in the presence of a haze-reducing additive, such as a fluorocarboxylic acid. In a preferred embodiment, the organotin compound is monobutyltin trichloride and the haze-reducing additive is trifluoroacetic acid.

As a feature of the invention, a liquid composition comprising the organotin compound and the fluoroacid is vaporized and is rapidly decomposed in air at an elevated substrate temperature to provide transparent, haze-free tin oxide coatings. These tin oxide coatings have less than 1% haze, greater than 70% visible transmission, and are obtained in a thickness of up to 250 nm in a deposition time of less than 25 seconds at a glass temperature of about 450°–750° C.

BRIEF DESCRIPTION OF THE DRAWING

In order to better understand the invention, reference will be made to the accompanying drawing in which:

The FIGURE is a schematic diagram of an apparatus or forming the tin oxide coated article of the invention.

DETAILED DESCRIPTION OF THE INVENTION

Referring now to the FIGURE, there is shown a diagrammatic representation of an apparatus suitable for carrying out a chemical vapor deposition process to form the tin oxide coated articles herein. Accordingly, a carrier gas 10 which includes oxygen, such as an oxygen-containing compound, with air being preferred, is metered through a feed line 11 at a predetermined flow rate suitably about 1–30 l/min., and preferably about 3–15 l/min., through an air dryer tower 12 to provide a stream 13 of dry air. A separate air stream may be directed through a humidifier 14 containing a suitable quantity of water 15 to provide a wet air stream 16 at a desired relative humidity. Thereby an air stream 17, either dry or wet, may be passed through an evaporator 18 contained in oil bath 19 for holding the liquid coating composition of the invention, The liquid composition is supplied to evaporator 18 by syringe pump 20 and syringe 21. The air stream is heated from the oil bath to a desired vaporization temperature before it enters evaporator 18.

The vaporized liquid coating composition in the air stream 22 travels to a deposition chamber 23 having a coating nozzle 24 in which a substrate 25 is mounted on a heated plate 26. After deposition of the desired coating, the gaseous by-products of the deposition are exhausted.

The term "alkyl" used herein with respect to the organotin compound includes a straight chain or branched alkyl group which has one to six carbon atoms.

Representative organotin compounds include alkyltin trichlorides, e.g. monobutyltin trichloride, isobutyltin trichloride, and methyltin trichloride; dialkyltindichlorides, e.g. dimethyltin dichloride, dibutyltin dichloride, diisobutyltin dichloride, and di-t-butyltin dichloride; alkyldichlorotin acetate e.g. butyldichlorotin acetate; alkylchlorotin diacetate, e.g. butylchlorotin diacetate; and an ester tin trichloride, e.g. carbethoxyethyltin trichloride.

Suitable haze-reducing additives include fluorine carboxylic acids and anhydrides, such as the following:

Carboxylic acids trifluoracetic acid
chlorodifluoroacetic acid
difluoroacetic acid
heptofluorobutyric acid
pentafluoropropionic acid
3-trifluoromethylcrotonic acid
nonafluoropentanoic acid Anhydrides trifluoroacetic anhydride
heptafluorobutyric anhydride
pentafluoropropionic anhydride
chlorodifluoroacetic anhydride
perfluoroglutaric anhydride
perfluorosuccinic anhydride The haze-reducing additive of the present invention can perform a dual function in the process of producing the tin oxide coatings of the invention. In addition to its primary haze-reducing function, the additive also may act as a fluorine dopant to impart a predetermined conductivity level to the coating. Accordingly, low concentrations of the haze-reducing additive will produce haze-free tin oxide coatings which have a relatively high sheet resistance, while increased concentrations of the haze-reducing additive will provide haze-free, fluorine-doped tin oxide coatings have a sheet resistance below about 40 ohms per square.

Generally, concentrations of the haze-reducing additive of less than 1-2% by wt. of the liquid coating composition, the rest being organotin compound, will produce transparent, haze-free tin oxide coatings which have a sheet resistance greater than 40 ohms per square, while higher concentrations of the haze-reducing additive, up to 30% by weight, will perform the dual function of providing transparent, haze-free, conductive coatings have a sheet resistance of less than 40 ohms per square.

The organotin compound and the haze-reducing additive generally are present as liquids at room temperature in the liquid coating composition. Such compositions can be vaporized easily at relatively low temperatures and decomposed at elevated temperatures onto a substrate to form the desired transparent, haze-free tin oxide coating.

The liquid coating composition also may include 1-10% of a polar organic compound, such as methylisobutyl ketone, acetic anhydride or ethyl acetate, which will insure that the composition remains stable in one liquid phase below room temperature, e.g. even at −15° C. Thereby the liquid coating composition may be conveniently stored outdoors or transported during winter weather without any phase separation.

The vaporization temperature in the process of preparing the articles of the invention usually ranges form about 100° to about 400° C., and preferably about ranges from about 150° to 250° C. The substrate temperature ranges from above 400° to about 750° C., preferably about 500° to about 650° C.

The carrier gas preferably is an oxygen-containing gas, which may be air or a mixture of oxygen and an inert gas, and is most preferably air.

The carrier air may be dry or wet in the process of the invention, and, accordingly, the relative humidity of the air at 18° C. may vary from 0–100%. Preferably the humidity ranges from 10–50%, where the rate of deposition is enhanced.

The air flow preferably ranges from about 1 to about 70 l/min. with the preferred rate being about 2-50 l/min.

The substrate to be coated may be glass, ceramics, solid state materials, metals, elemental filaments and the like, and is preferably glass.

In general, the invention produces tin oxide coated articles including transparent, haze-free tin oxide coatings on a substrate, which have less than 1% haze, and greater than 75% visible transmission.

The haze content of the tin oxide coatings of the invention was determined from Gardner hazemeter measurements on glass slides coated with tin oxide formed from the liquid coating composition herein, according to ASTM D1003-61 (Reapproved 1977)-Method A.

The visible transmittance was measured on a UV/vis spectrophotometer over the 400–800 nm region, versus air, and the % $T_{vis}$ was averaged over the wavelengths.

The film thickness was measured by the beta-backscatter method according to British Standards Institution method BS5411: Part 12, 1981, ISO 3543-1981.

The advantages of the invention can be more readily appreciated by reference to the following specific examples.

Table I shows the percent haze of tin oxide coated articles on glass obtained from a liquid coating composition of monobutyltin trichloride (MBTC) as the organotin compound, and trifluoroacetic acid (TFA) as the haze-reducing additive, at various wt. % TFA, compared with the haze content of tin oxide coatings made from monobutyltin trichloride alone and with uncoated glass.

TABLE I

Haze Content of Tin Oxide Coatings on Glass Obtained from a Liquid Coating Composition of Monobutyltin Trichloride (MBTC) as Organotin Compound and Trifluoroacetic Acid (TFA) as Haze-Reducing Additive at Different Wt. % TFA in the Composition.

| Wt. % TFA | % Haze |
| --- | --- |
| 0 | 1.80 |
| 1 | 0.95 |
| 2 | 0.85 |
| 5 | 0.82 |
| 10 | 0.80 |
| Uncoated Glass | 0.75 |

Coating Conditions - CVD: block temp. 650° C.; air temp. 150° C.; air flow 2 l/min; liquid comp. feed rate 1.2 ml/min; relative humidity 50% at 22° C.

The data in Table I shows that tin oxide coatings obtained a liquid coating compositions of monobutyltin trichloride and trifluoroacetic acid exhibit a haze of less than 1% which is a value substantially equal to that of uncoated glass. On the other hand, tin oxide coatings made from monobutyltin trichloride alone are hazy under all process conditions tested.

The reason that haze-free tin oxide coatings can be produced from monobutyltin trichloride, which is an organotin trihalide compound, and trifluoroacetic acid, is not well understood at present. However, this advantageous haze-reducing property of TFA may be related to the replacement of HCl by fluorine from the surface of the tin oxide in coatings formed from this composition.

Table II shows the results of comparative tests with other fluorine dopants and HCl absorbers as haze-reducing additives.

TABLE II

Comparative Tests with Fluorine Dopants and HCl Absorbers as Haze reducing Additives

| Additive | Wt. % | % Haze |
|---|---|---|
| TFA | 5 | 0.82 |
| Ethyltrifluoroacetate | 5 | 1.27 |
| Toluene | 5 | 1.49 |
| Acetic Acid | 5 | 1.62 |
| Methanesulfonic Acid | 5 | 2.30 |
| Octene | 5 | 3.97 |
| No Additive | — | 1.80 |
| Uncoated Glass | — | 0.75 |

Coating Conditions - CVD: block temp. 655° C., air temp. 150° C. (180° C. for methanesulfonic acid); air flow 42.6 l/min; liquid comp. feed rate 3.8 ml/min.

As shown in Table II, other fluorine compounds which are known dopants for tin oxide do not perform the desired hazing-reducing function characteristic of trifluoromethylacetic acid. For example, Table II, the ethyl ester of trifluoromethylacetic acid is ineffectual as a haze-reducing material, although it is an excellent dopant for MBTC. Similarly, compounds which ordinarily absorb HCl, such as octene, and other acids without fluorine, produce only very hazy coatings.

While the invention has been described with reference to particular embodiments thereof, it will be understood that changes and modifications may be made which are within the skill of the art. It is intended to be bound only by the claims which follow hereinafter.

We claim:

1. A tin oxide coated article comprising a transparent, haze-free tin oxide coating directly on a substrate selected from the group consisting of glass, ceramics, solid state materials, metals, an elemental filaments, wherein said tin oxide coating is formed by deposition from a liquid coating composition comprising an organotin compound which is an alkyltin trichloride, a dialkyltin dichloride, an alkyldichlorotin acetate, an alkylchlorotin diacetate, or an ester tin trichloride, and a haze-reducing additive which is a fluorocarboxylic acid or anhydride said tin oxide coated article having less than 1% haze.

2. A tin oxide coated article according to claim 1 wherein said substrate is glass.

3. A tin oxide coated article according to claim 1 wherein said organotin compound is an alkyltin trichloride.

4. A tin oxide coated article according to claim 3 wherein said alkyltin trichloride is monobutyltin trichloride.

5. A tin oxide coated article according to claim 1 wherein said haze-reducing additive is a trifluoromethylcarboxylic acid or anhydride.

6. A tin oxide coated article according to claim 5 wherein said trifluoromethylcarboxylic acid is trifluoroacetic acid.

7. A tin oxide coated article according to claim 1 wherein said haze-reducing additive also imparts a low sheet resistance to said article by doping with fluorine.

8. A tin oxide coated article according to claim 1 wherein said deposition is carried out by chemical vapor deposition.

9. A tin oxide coated article according to claim 8 in which said deposition comprises vaporizing said liquid coating composition and contacting said vapor in an oxygen-containing atmosphere with a substrate maintained at a temperature above the decomposition temperature of said vapor.

* * * * *